US012566657B1

(12) United States Patent
Patil et al.

(10) Patent No.: US 12,566,657 B1
(45) Date of Patent: Mar. 3, 2026

(54) DETECTING MEMORY HAZARDS IN MASSIVELY PARALLEL AND DISTRIBUTED SYSTEMS

(71) Applicant: Microsoft Technology Licensing, LLC, Redmond, WA (US)

(72) Inventors: Kiran Ananda Patil, Austin, TX (US); Monica M. Tang, Santa Clara, CA (US); Zsolt Mathe, Bellevue, WA (US); Nisheeth Srivastava, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/926,027

(22) Filed: Oct. 24, 2024

(51) Int. Cl.
G06F 11/07 (2006.01)
G06F 11/30 (2006.01)

(52) U.S. Cl.
CPC ........ G06F 11/079 (2013.01); G06F 11/0772 (2013.01); G06F 11/3037 (2013.01)

(58) Field of Classification Search
CPC . G06F 11/0772; G06F 11/079; G06F 11/3037
See application file for complete search history.

(56) References Cited

U.S. PATENT DOCUMENTS

| | | | | |
|---|---|---|---|---|
| 7,343,459 B2 * | 3/2008 | Prahlad | ................. | G06F 3/0481 |
| | | | | 707/999.204 |
| 10,503,536 B2 * | 12/2019 | Gunda | ..................... | G06F 9/06 |
| 11,693,725 B2 * | 7/2023 | Alsop | ................... | G06F 9/3877 |
| | | | | 714/48 |
| 2013/0031428 A1 * | 1/2013 | Rapp | ................... | G06F 11/0715 |
| | | | | 711/170 |
| 2023/0229764 A1 * | 7/2023 | Vohra | .................... | G06F 3/0623 |

* cited by examiner

*Primary Examiner* — Aracelis Ruiz

(57) ABSTRACT

Systems and methods are provided for detecting memory hazards in memory, such as in massively parallel and distributed systems. In examples, a memory hazard logic detects access of a memory by a device communicatively coupled to the memory. The memory hazard logic identifies a memory access type and a memory address range being accessed, based on information obtained when monitoring a memory access transaction between the device and the memory. The memory hazard logic determines whether the memory access type on the memory address range is subject to memory access rules contained in a rules table. If so, the memory hazard logic determines whether the memory access type matches a memory access rule associated with each memory address in the memory address range. For each such memory address, the memory hazard logic notifies the device regarding a memory hazard triggered by the memory access transaction.

20 Claims, 7 Drawing Sheets

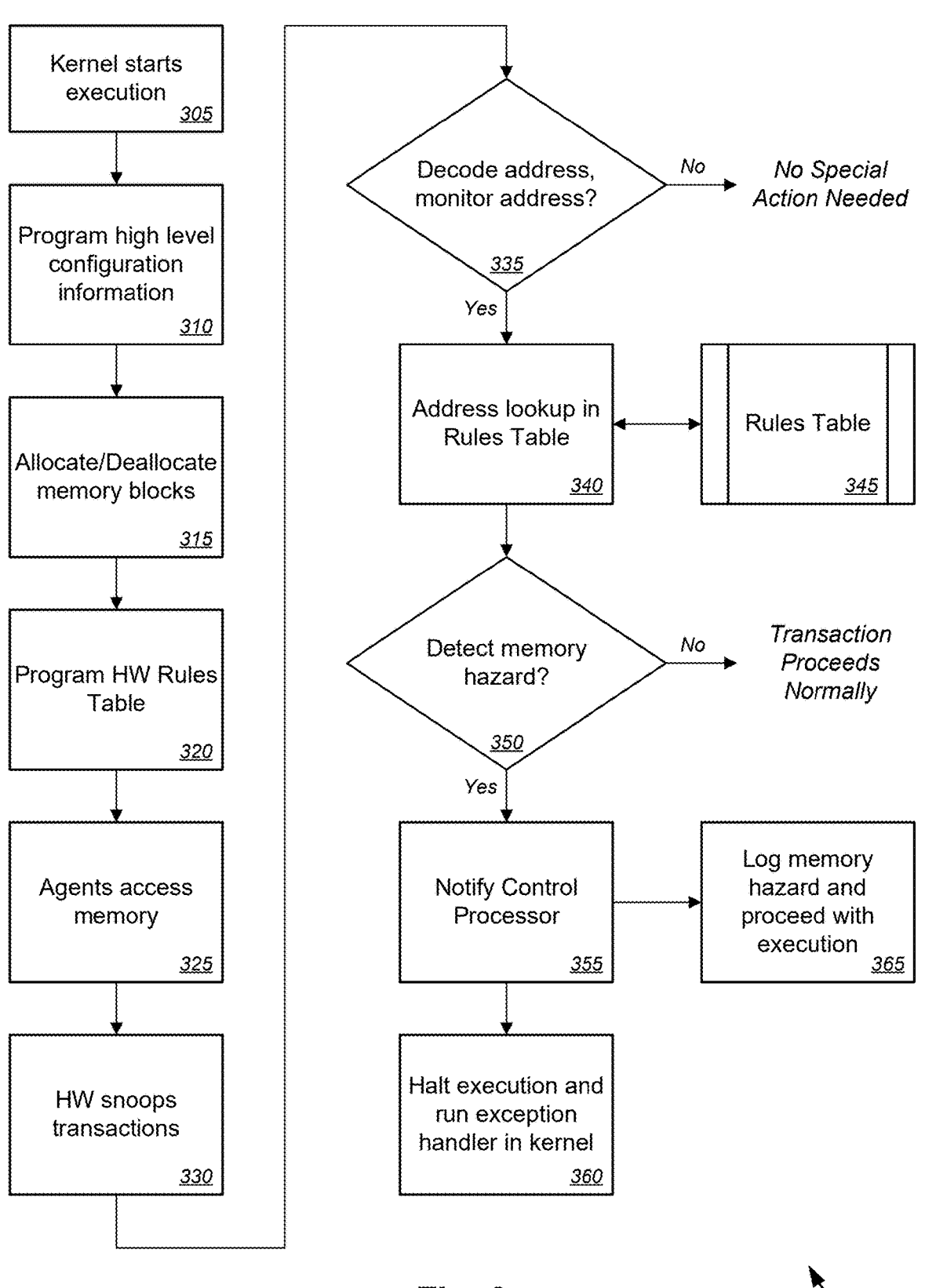

Kernel starts execution 305

Program high level configuration information 310

Allocate/Deallocate memory blocks 315

Program HW Rules Table 320

Agents access memory 325

HW snoops transactions 330

Decode address, monitor address? 335

No → No Special Action Needed

Yes

Address lookup in Rules Table 340 ↔ Rules Table 345

Detect memory hazard? 350

No → Transaction Proceeds Normally

Yes

Notify Control Processor 355 → Log memory hazard and proceed with execution 365

Halt execution and run exception handler in kernel 360

DETECTING MEMORY HAZARDS IN MASSIVELY PARALLEL AND DISTRIBUTED SYSTEMS

BACKGROUND

Distributed systems and architecture are evolving at rapid speed, leading to increasing numbers of memory transactions or memory access attempts. Programming and/or synchronization errors with respect to memory transactions or memory access increase correspondingly. To avoid producing functionally incorrect and/or sub-optimal (i.e., less than 100% accurate) results, it is important to detect and report such errors as quickly as possible. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for detecting memory hazards in memory, such as in massively parallel and distributed systems. In examples, a memory hazard logic detects access of a memory by a device that is communicatively coupled to the memory, e.g., when monitoring memory access transactions between the device and the memory. The memory hazard logic identifies a memory access type and a memory address range being accessed, based on information obtained when monitoring a memory access transaction between the device and the memory that is associated with the detected access of the memory. The memory hazard logic determines whether the memory access type on the memory address range is subject to memory access rules contained in a rules table. Based on a determination that the memory access type on the memory address range is subject to the memory access rules, the memory hazard logic determines whether the memory access type matches a memory access rule associated with each memory address in the memory address range. For each memory address in the memory address range that is associated with a memory access rule with which the memory access type is determined to match, the memory hazard logic determines whether a memory hazard is triggered by the memory access transaction by analyzing the memory access transaction associated with that memory address, and, based on a determination that a memory hazard is triggered, notifies the device regarding the memory hazard being triggered by the memory access transaction.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIG. 3 depicts an example sequence flow for implementing detection of memory hazards in memory.

DETAILED DESCRIPTION OF CERTAIN EMBODIMENTS

Figure 1:
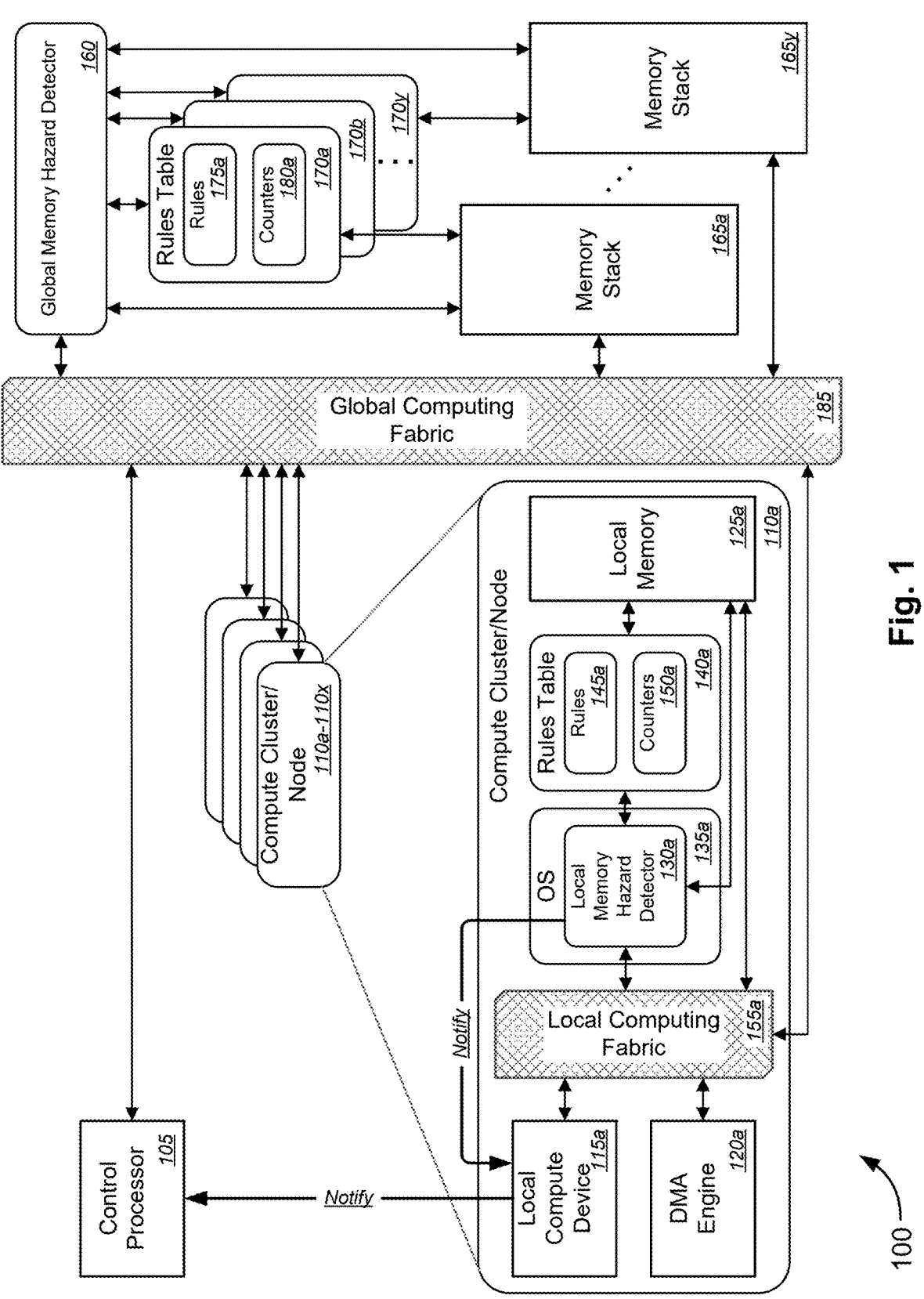
FIG. 1 depicts an example system for detecting memory hazards in memory, such as in massively parallel and distributed systems.

As briefly discussed above, distributed systems and architecture are evolving at rapid speed. Domain-specific hardware and software are also evolving rapidly to address ever-growing system and workload requirements. Workloads like artificial intelligence ("AI"), content processing, or other workloads bring in unique challenges and requirements. To address those ever-increasing requirements, an architecture such as a distributed and parallel accelerators-based approach or a distributed and parallel compute approach is used in some examples. Likewise, domain-specific programming approaches are becoming ubiquitous, domain specific programming approaches allowing the use of massively parallel domain-specific hardware which are custom-tailored for specific workloads. Although efficient code to leverage underlying system primitives can be written, there remains the challenges of programming and/or synchronization errors with respect to memory accesses, which necessitates detecting and reporting such errors as quickly as possible, with a system-level approach. It is important to catch such issues as early as possible, so that the system does not produce functionally incorrect and/or sub-optimal (less than 100% accurate) results. In some examples, domain-specific hardware is built with components like control processors, compute devices (e.g., custom-built accelerators like matrix multipliers and/or vectors processor units), direct memory access ("DMA") engines (to move blocks of data across different tiered memories), local and global computing fabrics, and synchronization primitives. In a typical operating mode, a control processor sends commands to the compute devices and wait for results. Command and response dependency is handled via hardware-based synchronization primitives such as semaphores. Due to programming and/or synchronization errors with respect to memory accesses, stale and/or incorrect data may be accessed and/or data may be overwritten, which necessitates providing protections against such situations.

The present technology provides for detecting memory hazards in memory, such as in massively parallel and distributed systems. In examples, a combination of hardware that contains hardened logic as well as programmable hardware components (e.g., page tables or rules tables and configuration setup) and software that programs hardware blocks during program execution to achieve desired behavior, which includes configuring hardware, programming page tables or rules tables as needed, and programming transition rules. During the execution of a program or kernel, after the hardware has been configured, the hardware monitors memory accesses, applies software programmed rules, detects memory hazards or issues, and notifies software of detected memory hazards or issues. Different from use of central processing unit ("CPU") registers (e.g., where a CPU data hazard detector works to detect hazards between instructions based on CPU register usage), the present technology is directed to a system level hazard detector that works with a DMA engine and with the memory to detect memory hazards or issues. In some examples, the memory hazards or issues include a read before write error, a double write error, a double read error, an N-reads before write error, an N-writes error, and/or an N-reads error, which are described in detail below. In this manner, the memory hazards or issues either can be addressed by an exception handler or can be logged with other memory regions being used by the program or kernel to proceed with execution. These are described in detail below with respect to the figures. As used herein, memory errors (such as the read before write error and the other errors mentioned above) refer to errors in how the memory is accessed or used, and/or how such memory errors can detrimentally affect operations of the system. From a software perspective, memory errors and memory hazards are effectively the same. From a hardware perspective, memory errors can refer to presence of some bad or defective bits in the memory and the physical memory cell is not functioning correctly or at all.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-6 illustrate some of the features of methods, systems, and apparatuses for implementing detection of memory hazards in memory, such as in massively parallel and distributed systems, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

FIG. 1 depicts an example system 100 for detecting memory hazards in memory, such as in massively parallel and distributed systems. System 100 includes a control processor 105 and a plurality of compute clusters or nodes 110a-110x (collectively, "compute clusters 110" or "compute nodes 110"). Each compute node 110 includes one of local compute devices 115a-115x (collectively, "local compute devices 115"), one of direct memory access ("DMA") engines 120a-120x (collectively, "DMA engines 120"), and one of local memory devices 125a-125x (collectively, "local memory devices 125" or "local memory 125"). Each compute node 110 further includes one of local memory hazard detectors 130a-130x (collectively, "memory hazard detectors 130") running on corresponding operating systems ("OSs") 135a-135x (collectively, "OSs 135"), each of which runs on the corresponding local compute devices 115a-115x. In examples, each compute node 110 further includes one of rules tables 140a-140x (collectively, "rules tables 140") that is associated with a corresponding one of the local memory devices 125a-125x. Each rules table 140 is either stored on a corresponding one of the local memory 125 or stored on another memory that corresponds to the one of the local memory 125. On each rules table 140 may be stored a set of memory access rules among sets of memory access rules 145a-145x (collectively, "memory access rules 145" or "rules 145"), and, in some cases, a set of counters among sets of counters 150a-150x (collectively, "counters 150") as well. For each compute node 110, one of local computing fabrics 155a-155x (collectively, "local computing fabrics 155") is used to communicatively couple a corresponding one of the local compute devices 115, a corresponding one of the DMA engines 120, a corresponding one of the local memory 125, and a corresponding one of the local memory hazard detectors 130 with each other. In an example, for compute node 110a, local computing fabric 155a is used to communicatively couple local compute device 115a, DMA engine 120a, local memory 125a, and local memory hazard detector 130a (running on OS 135a) with each other. In some examples, local memory hazard detector 130a is used to detect memory hazards in local memory 125a, based on rules 145a and/or counters 150a in rules table 140a corresponding to local memory 125a, as described in detail below with respect to FIGS. 3-5B.

In examples, system 100 further includes global memory hazard detector 160, memory stacks 165a-165y (collectively, "memory stacks 165"), and rules tables 170a-170y (collectively, "rules tables 170") corresponding to memory stacks 165a-165y, respectively. As used herein, local refers to components accessible within one compute cluster, while global refers to components spanning the plurality of compute clusters and other components (e.g., memory stacks) accessible by all of the compute clusters. Each rules table 170 is either stored on a corresponding one of the memory stacks 165 or stored on another memory that corresponds to the one of the memory stacks 165. On each rules table 170 may be stored a set of memory access rules 175a-175y (collectively, "memory access rules 175" or "rules 175"), and, in some cases, a set of counters 180a-180y (collectively, "counters 180") as well. Herein, x and y are non-negative integer numbers that may be either all the same as each other, all different from each other, or some combination of same and different (e.g., one set of two or more having the same values with the others having different values, a plurality of sets of two or more having the same value with the others having different values). System 100 further includes a global computing fabric 185 that is used to communicatively couple control processor 105, compute nodes 110a-110x via corresponding local computing fabric 155a-155x, and memory stacks 165a-165y with each other. In examples, global memory hazard detector 160 is used to detect memory hazards in each of memory stacks 165a-165y, based on rules 175a-175y and/or counters 180a-180y in rules tables 170a-170y corresponding to that memory stack 165.

In some examples, the control processor 105 includes one of an orchestrator, a scheduler, or an AI system processor ("ASP"). In an example, the orchestrator performs automated configuration, coordination, and management of computing systems and software in the system (e.g., compute clusters or nodes 110a-110x, local compute devices 115a-115x, DMA engines 120a-120x, local memory hazard detectors 130a-130x, OSs 135a-135x, and/or global memory hazard detector 160). In some examples, the scheduler is a task or job scheduler that launches computer programs or scripts at pre-defined times or after specified time intervals for computing systems and software in the system. In examples, the ASP includes an AI accelerator, a deep learning processor, or a neural processing unit that accelerates artificial intelligence and machine learning applications (such as artificial neural networks and machine vision) run on the compute cluster(s) or node(s) 110a-110x and/or the local compute device(s) 115a-115x. In various examples, the control processor 105 is used to perform functions including: (a) sending messages to a local compute device(s) 115 to schedule control of the compute device(s) 115; (b) sending messages to a DMA engine(s) 120 to schedule control of the DMA engine(s) 120; (c) tracking memory errors or memory hazards associated with access of a memory (e.g., local memory 125a-125x or memory stack 165a-165y) by the compute device(s) 115 and/or the DMA engine(s) 120; and (d) scheduling commands and programs across the compute device(s) 115 and/or the DMA engine(s) 120. In some cases, each local compute device 115 includes one of a CPU, a graphics processing unit ("GPU"), or an AI accelerator. In some instances, the AI accelerator includes a neural processing unit ("NPU"), a tensor processing unit ("TPU"), or a machine learning ("ML") processor. In some examples, each local memory 125 or each memory stack 165 is a shared memory including one of a random access memory ("RAM"), a static RAM ("SRAM"), a dynamic RAM ("DRAM"), a synchronous dynamic RAM ("SDRAM"), a double data rate ("DDR") memory, a graphics DDR ("GDDR") memory, a GDDR SDRAM, or a high bandwidth memory ("HBM") stack. The local memory 125 and the memory stacks 165 are each different from disk storage or other similar data storage devices.

In some examples, the ASP is part of an AI system that includes generative AI and/or ML models such as small language models ("SLMs"), large language models ("LLMs"), or other language models. Alternatively or additionally, the AI system includes other ML models that are non-LLM models or non-language models, the other ML models including convolutional neural networks ("CNNs"), recurrent neural networks ("RNNs"), deep neural networks ("DNNs"), transformers, and/or long short-term memory networks ("LSTMs"). As used herein, an LLM refers to a machine learning model that is trained and fine-tuned on a large corpus of media (e.g., text, audio, video, or software code), and that can be accessed and used through an application programming interface ("API") or a platform. An SLM is similar to an LLM, except that it has fewer parameters and requires less data and time to be trained. An SLM and an LLM each performs a variety of tasks, including generating and classifying media, answering user requests and questions in a conversational manner, and translating text from one language to another. Examples of LLMs (or more generally language models ("LMs")) include Bidirectional Encoder Representations from Transformers ("BERT"), Word2Vec, Global and Vectors ("GloVe"), Embeddings from Language Models ("ELMo"), XLNet, Generative Pre-trained Transformer ("GPT")-3 or GPT-4, Large Language Model Meta AI ("LLaMA") 2, or Big-Science Large Open-science Open-access Multilingual Language Model (BLOOM). In examples, the other ML models include multimodal models that are capable of either one or more of text, image, audio, or video as both input and output, or using one or a first combination of text, image, audio, and/or video as input and using another or a second combination of text, image, audio, and/or video as output. Examples of multimodal models include GPT-4 (which can use both text and image as inputs), LLAMA 2 (which allows for image and video inputs), or Gemini (which was designed to process text, images, audio, video, and computer code).

In operation, local memory hazard detector 130a-130x and/or global memory hazard detector 160, and underlying memory hazard logic, may perform methods for implementing detection of memory hazards in memory, as described in detail with respect to FIGS. 2-5. For instance, example sequence flows 200 and 300 as described below with respect to FIGS. 2 and 3, respectively, and example methods 400, 500A, and 500B as described below with respect to FIGS. 4, 5A, and 5B, respectively, may be applied with respect to the operations of system 100 of FIG. 1.

In some aspects, a memory hazard detector (whether local memory hazard detector 130 or global memory hazard detector 160), using memory hazard logic, detects access of a memory (one of local memory 125a-125x or one of memory stacks 165a-165y) by one of a DMA engine (e.g., one of DMA engines 120a-120x) or a compute device (e.g., one of local compute devices 115a-115x) that is communicatively coupled to the memory, e.g., when monitoring memory access transactions between the one of the DMA engine or the compute device and the memory. The memory hazard detector identifies a memory access type and a memory address range being accessed, based on information obtained when monitoring a memory access transaction between the one of the DMA engine or the compute device and the memory that is associated with the detected access of the memory. In some instances, monitoring the memory access transaction is performed by implementing a snooping function on memory access transactions on a bus or a computing fabric (e.g., computing fabric 155a-155x and/or 185) that communicatively couples the one of the DMA engine or the compute device with the memory.

In examples, the memory access type includes one of a store request corresponding to an expected write function, a load request corresponding to an expected read function, an upstream transaction request, a downstream transaction request, or other memory access requests. In examples, the rules tables each includes a page table. In some examples, a memory access rule corresponds to a memory address in a memory address range of a memory. In examples, each memory address in the memory address range corresponds to a memory page that is stored in memory and that is referenced in a page table or in a rules table. As used herein, a memory page refers to a fixed-length contiguous block of virtual memory corresponding to a smallest unit of data for memory management in an OS that uses virtual memory, and that is described by a single entry in a page table.

The memory hazard detector determines whether the memory access type on the memory address range is subject to memory access rules (e.g., one of the sets of rules 145a-145x or 175a-175y) contained in a rules table (e.g., one of rules tables 140a-140x or 170a-170y) that is configured, maintained, or updated (collectively referred to herein as "maintained") by the control processor. In examples, determining whether the memory access type on the memory address range is subject to memory access rules is performed based on checking a configuration table that indicates which memory ranges are subject to checks and a type of memory hazard to detect per memory range. In an example, the rules table, when created, divides the global memory into fixed regions. Mapping to a table entry of the rules table is performed by using a subset of upper bits of the memory address, in some cases, by shifting the memory address to the right by a number of bits corresponding to a single memory region size. For instance, if the memory is divided into 64 KB regions, with every 64 KB region mapping to a table entry in the rules table, then to determine the table entry, the memory hazard detector would right shift the memory address by 16 bits to remove the low 16 bits to map into the table. In another example, memory addresses are mapped to the table entries of the rules table by using a hash function, where a mapping equation includes: Rules table entry=hash function (memory address) mod a number of rules table entries, where "mod" (also represented by "%") refers to a modulo operation, which returns a remainder of a division, after one value is divided by another value. In this case, Rules table entry equals the remainder of the division in which hash function (memory address) is divided by a number of rules table entries. In yet another example, load requests, store requests, upstream transaction requests, downstream transaction requests, or other requests that involve reading or writing of data contained in memory are subject to the memory access rules described below, while other memory access types (like a memory range for code segment) are not subject to memory access rules described below. In memory ranges for code segments, such memory access rules are not applicable. This is because near memory regions may contain data or code. If it contains code, then such memory regions do not participate in checks controlled through rules table configurations.

Based on a determination that the memory access type on the memory address range is subject to the memory access rules, the memory hazard detector determines whether the memory access type matches a memory access rule associated with each memory address in the memory address range. In an example, the memory access rule associated with the memory address range includes flagging memory hazards including one of: (1) a read before write error; (2) a double write error; (3) a double read error; (4) an N-reads before write error; (5) an N-writes error; or (6) an N-reads error. In a desired sequence of memory accesses for certain memory regions, a read function (or load request) occurs after a write function (or store request), ideally in a write-read-write-read . . . write-read sequence. Due to programming error or synchronization issues, however, when a memory read transaction (or load request) is committed before a memory write transaction (or store request), which is referred to as a read before write error, what is read may be stale data, incorrect data, sub-optimal data, or zero or null data. When a memory write transaction (or store request) occurs more than once before a memory read transaction (or load request), which is referred to as a double write error for two memory write transactions in a row or an N-writes error for more than two memory write transactions in a row, data is overwritten and lost. When a memory read transaction (or load request) occurs more than once before a memory write transaction (or store request), which is referred to as a double read error for two memory read transactions in a row or an N-reads error or an N-reads before write error for more than two memory read transactions in a row, such errors, in some cases, can lead to crashes, data corruption, incorrect data, or sub-optimal results. As used herein, sub-optimal data or results refers to data or results that are less than 100% accurate.

As used herein, N with respect to memory hazards (4)-(6) refers to an integer number of instances of these errors, and, in some cases, is tracked using a corresponding sequence counter among the counters 150a-150x and/or 180a-180y. In examples, N further refers to a configurable number of memory accesses (e.g., reads or writes) used as a threshold for triggering a memory hazard exception. Other counters among the counters 150a-150x and/or 180a-180y may also be used. In examples, such counters include a sequence total counter, a write counter, a read counter, a sequence counter, a sequential write counter, and/or a sequential read counter. The sequence total counter indicates a total number of write functions and read functions that correspond to both store requests and load requests corresponding to the memory access types requested for a memory page. The write counter indicates a number of write functions that corresponds to store requests corresponding to the memory access types requested for a memory page. The read counter indicates a number of read functions that corresponds to load requests corresponding to the memory access types requested for a memory page. The sequence counter indicates one of a number of sequential write functions that correspond to sequential store requests corresponding to the memory access types requested for a memory page or a number of sequential read functions that correspond to sequential load requests corresponding to the memory access types requested for a memory page. The sequential write counter indicates a number of sequential write functions before a read function that correspond to sequential store requests before a load request corresponding to the memory access types requested for a memory page. The sequential read counter indicates a number of sequential read functions before a write function that correspond to sequential load requests before a store request corresponding to the memory access types requested for a memory page.

In examples, the memory access rule for each memory page includes current state bits indicating whether a current state of that memory page is a write state or a read state. In an example, determining whether the memory access type matches the memory access rule associated with each memory address in the memory address range includes, for each memory address, determining whether the memory access type triggers one of the memory hazards, by comparing a state bit associated with the memory access type for that memory address with the current state bits for the corresponding memory page. In examples, the state bit associated with the memory access type is one of a write bit or a read bit. For example, if the current state bit for a memory page is a write bit, and the memory access type corresponds to a store request and/or a write function, the memory access type would trigger a double write error. If the current state bit for a memory page is a read bit, and the memory access type corresponds to a load request and/or a read function, the memory access type would trigger a double read error. If the current state bit for a memory page is a read bit, and the memory access type corresponds to a store request and/or a write function, the memory access type would trigger a read before write error.

In some examples, the counters are used to determine whether there are memory errors or memory hazards for a memory page. In an example, half of the memory access transactions from the sequence total counter should be memory write transactions (or store requests), while the other half should be memory read transactions (or load requests). If a comparison between a write counter and a sequence total counter for a memory page indicates that more than half of the total memory access attempts or transactions are memory write transactions (or store requests), then such imbalance likely indicates either a double write error or an N-writes error has occurred for that memory page. If a comparison between a read counter and a sequence total counter for a memory page indicates that more than half of the total memory access attempts or transactions are memory read transactions (or load requests), then such imbalance likely indicates a double read error or an N-reads error has occurred for that memory page. If a comparison between a read counter and a write counter for a memory page indicates that there are more memory read transactions (or load requests) compared with memory write transactions (or store requests), then such imbalance likely indicates a double read error or an N-reads error has occurred for that memory page. If a comparison between a read counter and a write counter for a memory page indicates that there are more memory write transactions (or store requests) compared with memory read transactions (or load requests), then such imbalance likely indicates either a double write error or an N-writes error has occurred for that memory page. The sequence counter more directly tracks multiple reads in a row or multiple writes in a row, while the sequential write counter directly tracks multiple writes in a row, and the sequential read counter directly tracks multiple reads in a row. Alternatively, in another example, if the read counter holds a value that exceeds a set threshold number of reads, then a double read error or an N-reads error is triggered. Similarly, if the write counter holds a value that exceeds a set threshold number of writes, then a double write error or an N-writes error is triggered.

For each memory address in the memory address range that is associated with a memory access rule with which the memory access type is determined to match, the memory hazard detector determines whether a memory hazard is triggered by the memory access transaction by analyzing the memory access transaction associated with that memory address, and, based on a determination that a memory hazard is triggered, notifies the one of the DMA engine or the compute device regarding the memory hazard being triggered by the memory access transaction. In some cases, the memory hazard detector notifies the compute device, which subsequently notifies the control processor. In FIG. 1, notification is depicted by thick-headed arrows labelled "Notify" from local memory hazard detector 130a to local compute device 115a, and from local compute device 115a to control processor 105, although such notification would actually be passed through local computing fabric 155a in the former case and through both the local computing fabric 155a and the global computing fabric 185 in the latter case. In examples, notifications regarding the memory hazard triggered by the memory access transaction includes sending a message, triggering an interrupt, or generating a non-fatal exception. In some examples, after the one of the DMA engine or the compute device receives the notification regarding memory hazard for a memory page or memory address range, the one of the DMA engine or the compute device can avoid using that particular memory page or memory address range. In an example, if the compute device receives the notification, the compute device can access other portions of the memory using the DMA engine, without accessing the particular memory page having the memory hazards. In another example, if the DMA engine receives the notification, the DMA engine can track the particular memory page having the memory hazards for current and future use avoidance.

Figure 2:
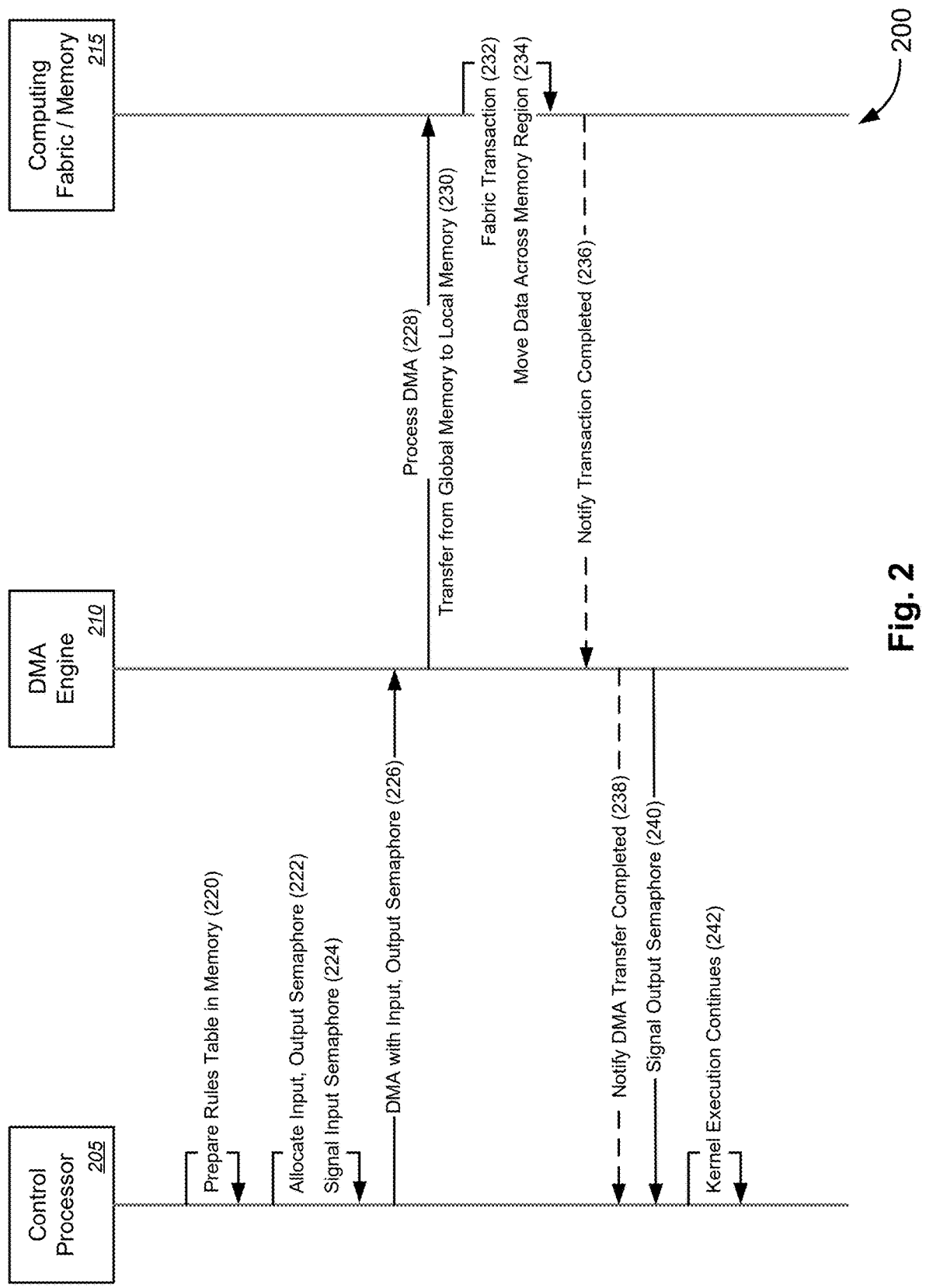
FIG. 2 depicts an example sequence flow for reprogramming a rules table that is used when implementing detecting memory hazards in memory.

FIG. 2 depicts an example sequence flow 200 for reprogramming a rules table that is used when implementing detecting memory hazards in memory. In some embodiments, control processor 205, DMA engine 210, and computing fabric/memory 215 of FIG. 2 may be similar, if not identical, to the control processor 105 or local compute device(s) 115a-115x, the DMA engine(s) 120a-120x, and the computing fabric(s) 155a-155x and 185 as well as the local memory 125a-125x or memory stacks 165a-165y, respectively, of system 100 of FIG. 1, and the description of these components of system 100 of FIG. 1 are similarly applicable to the corresponding components of FIG. 2.

Efficacy of the techniques described herein becomes challenging in ever-changing software models, where an intended behavior for the software for a given memory range changes from run-to-run and even within a run, or between different phases of a given run. As used herein, a run refers to an instance during which a program is executed or when a set of programs is scheduled to execute. Re-programming (as controlled by a kernel of an OS running on the control processor 205) is needed because the software re-uses the same buffer (or the same memory location) for different purposes, hence memory access rules or hazard rules (to be identified) change accordingly. To accomplish the intended behavior, the page table or the rules table in hardware is re-programmed. This re-programming stage of the page table or the rules table can be addressed using the combination of the DMA engine and input semaphores. As used herein, a semaphore refers to a variable that is used to control access to a common resource (in this case, memory) by multiple threads or multiple devices (e.g., DMA engine(s) and computing device(s)). In examples, the software on the control processor 205 prepares a new page table or a new rules table in a memory (e.g. local memory 125a-125x or memory stack 165a-165y of FIG. 1) (at operation 220) and allocates input and output semaphores (at operation 222). The input semaphore is signaled by the control processor 205 (at operation 224). At operation 226, the control processor 205 uses the input and output semaphores to signal the DMA engine 210 (using a protocol such as code division multiple access ("CDMA") or time division multiple access ("TDMA")), which is waiting on an input semaphore. Upon signaling with the input semaphore, the DMA engine 210 processes direct memory access (at operation 228) and performs a transfer of page table or rules table content from the memory stack or the local memory (e.g., HBM or SRAM) to memory for the page table or the rules table (e.g., another SRAM that is addressable by the DMA engine) or from global memory to local memory (at operation 230). At operation 232, the computing fabric or memory 215 performs fabric transaction, and moves data across memory regions (at operation 234). When transfer is completed, the computing fabric or memory 215 notifies the DMA engine 210 that the transaction has been completed (at operation 236). The DMA engine 210 subsequently notifies the control processor 205 that the DMA transfer has been completed (at operation 238) and signals an output semaphore (at operation 240), which the control processor 205 is waiting on. Indication of an output semaphore implies that hardware configurations with respect to programming page table entries or rules table entries are completed. After receiving the signal on the output semaphore, the control processor 205 resumes or continues with subsequent processing such as executing the rest of the kernel (at operation 242).

FIG. 3 depicts an example sequence flow 300 for implementing detection of memory hazards in memory. At operation 305, a kernel or software on a control processor (e.g., control processor 105 of FIG. 1) begins execution of a workload. At operation 310, the kernel or the software proceeds to program high level configuration information, in some cases, by programming hardware blocks. In some cases, the hardware blocks include a configuration table, distributed page tables, or rules tables. Typically, systems have Gigabytes (GBs) of system memory and Megabytes (MBs) of cache-like memory (in some cases, tiered memory or similar memory structures) but not all of the memory is subject to checks for memory hazards or for memory access rules (such as the memory hazards and memory access rules described herein). In examples, the configuration table indicates (i) which memory ranges are subject to checks pertaining to memory access rules and/or (ii) a type(s) of memory hazard to detect per memory range. In some examples, the distributed page tables or rules tables indicate applicable memory address ranges and memory access rules for each of those memory address ranges, in some instances, listing memory ranges to track for applying memory access rules. In some cases, each page table or rules table includes entries each corresponding to a memory page. In some instances, an entry for a memory page includes configuration bits indicating whether or which memory access rules apply to that memory page, and access bits indicating a current access state for the memory page (whether a read state or a write state). In some cases, programming the high level configuration information includes programming or setting the configuration bits for memory pages based on whether or which memory access rules apply to each of these memory pages. In an example, distributed and dedicated page tables or rules tables are used over a global page table or rules table, which may be subject to contention in which multiple processes or instances compete for access to the same data block at the same time. In examples, a dedicated page table or rules table is used per memory stack channel (covering only a specific address range corresponding to that memory stack) and is likewise used per local memory (covering only a specific address range corresponding to the local memory). In an example, another memory (e.g., SRAM) is used for each dedicated page table or rules table. Although hardware memory is typically used in interleaved addressing mode, memory as described herein, in some examples, is used in linear addressing mode. Linear addressing mode greatly simplifies usage of page tables and substantially reduces the sizes of page tables, which, in an example, directly impact SRAMs needed to hold the page tables in memory. With linear addressing mode, each page table addresses only local memory regions. Where interleaved addressing refers to memory in which memory addresses are spread evenly across memory banks, linear memory mode refers to memory addressing in which memory is organized in a single contiguous address space.

At operation 315, the kernel or software allocates or deallocates memory blocks in a memory region of the memory (e.g., HBM, SRAM, or other memory). At operation 320, the kernel or software proceeds to program the page table or rules table, with respect to the allocated or deallocated memory blocks or memory regions. For allocated memory blocks or memory regions, the kernel or software proceeds to program the corresponding entries of the page table or the rules table pertaining to the allocated memory blocks or memory regions to indicate that the allocated memory blocks or memory regions are subject to memory access rules, and in some, instances, to also indicate which memory access rules are applicable to the memory blocks or memory regions, and to indicate a current access state of null (as the allocated memory blocks or memory regions have just been allocated and have neither been read or written to). For deallocated memory blocks or memory regions, the kernel or software proceeds to program the corresponding entries of the page table or rules table pertaining to the deallocated memory blocks or memory regions to indicate that the deallocated memory blocks or memory regions are not subject to memory access rules. In an example, page tables or rules tables are programmed using control and status register ("CSR") writes, where a CSR (also referred to as a register map) is an auxiliary register that is used for reading a status and changing configurations whereas integer registers and floating registers are used for computations. In another example, page tables or rules tables are programmed via software (in some cases, via DMA) using memory load and memory store functions for memory regions of page tables or rules tables that have been memory-mapped. In examples, these page tables or rules are dynamically changed as needed and are subject to change from run-to-run and even during a run. In yet another example, page tables or rules tables are programmed via hardware by using software to submit a command to program these tables and using hardware to send a response via notifications such as "signal the semaphore" notifications when programming of these page tables or rules tables has been completed.

At operation 325, one or more system agents (e.g., an agent of a local compute device, a DMA engine, or other agent) accesses the memory regions, in some cases, in the form of memory load and/or store functions. In examples, memory access appears as a transaction on a local and/or global fabric. At operation 330, transactions are monitored (e.g., snooped) and forwarded to memory hazard logic to detect hazardous memory accesses. At operation 335, the memory hazard logic decodes the memory address (or memory address range) based on the monitored transactions, and determines whether to monitor the memory address (or the memory address range). That is, the memory hazard logic determines whether the memory address (or the memory address range) is subject to memory access rules. In an example, the memory hazard logic determines whether a memory address (or a memory address range) is subject to memory access rules based on whether the memory address (or the memory address range) is within of the known memory address range corresponding to memory that is subject to memory access rules (such as within a list tracking memory ranges for applying memory access rules, as referred to above with respect to operation 310). In some examples, if the memory address or memory address range is listed within or programmed in a page table or a rules table, then it is determined to be subject to memory access rules, and if it is not listed within or programmed in the page table or the rules table, then it is determined to not be subject to memory access rules. Based on a determination that the memory address (or the memory address range) is not subject to memory access rules, no special action is needed, and transaction proceeds normally. Alternatively, based on a determination that the memory address (or the memory address range) is subject to memory access rules, at operation 340, the memory hazard logic performs address lookup in the page table or the rules table (e.g., rules table 345).

At operation 350, for each memory address being accessed by the monitored transaction, the memory hazard logic determines whether a memory hazard has been detected for the transaction on that memory address. In an example, the memory hazard logic compares the expected operation based on the transaction (e.g., load request or store request) with the access bit(s) (and in some cases, a counter(s)) for that memory address to identify whether one of the memory hazards exist (e.g., a read before write error, a double write error, a double read error, an N-reads before write error, an N-writes error, or an N-reads error, as described above). If no such memory hazards are detected, then transaction proceeds normally. However, upon detection of such memory hazards, the memory hazard logic notifies or reports the memory hazard or memory error to the agent accessing the memory (at operation 355). In an example, the memory hazard logic notifies or reports the memory hazard or memory error by sending a notification or a report, which, in some cases, includes metadata information related to the memory hazard or memory error. In another example, the memory hazard logic notifies or reports the memory hazard or memory error in the form of an exception or interrupt to the kernel or software. Handling of such exception is at the discretion of the kernel or software (e.g., either to halt the complete kernel execution or to just log errors and continue). At operation 360, an exception handler in the kernel or software is run to handle the memory hazard, while execution is halted. Alternatively, the kernel or software logs the memory hazard and proceeds with execution of other portions of the workload (at operation 365).

Figure 4:
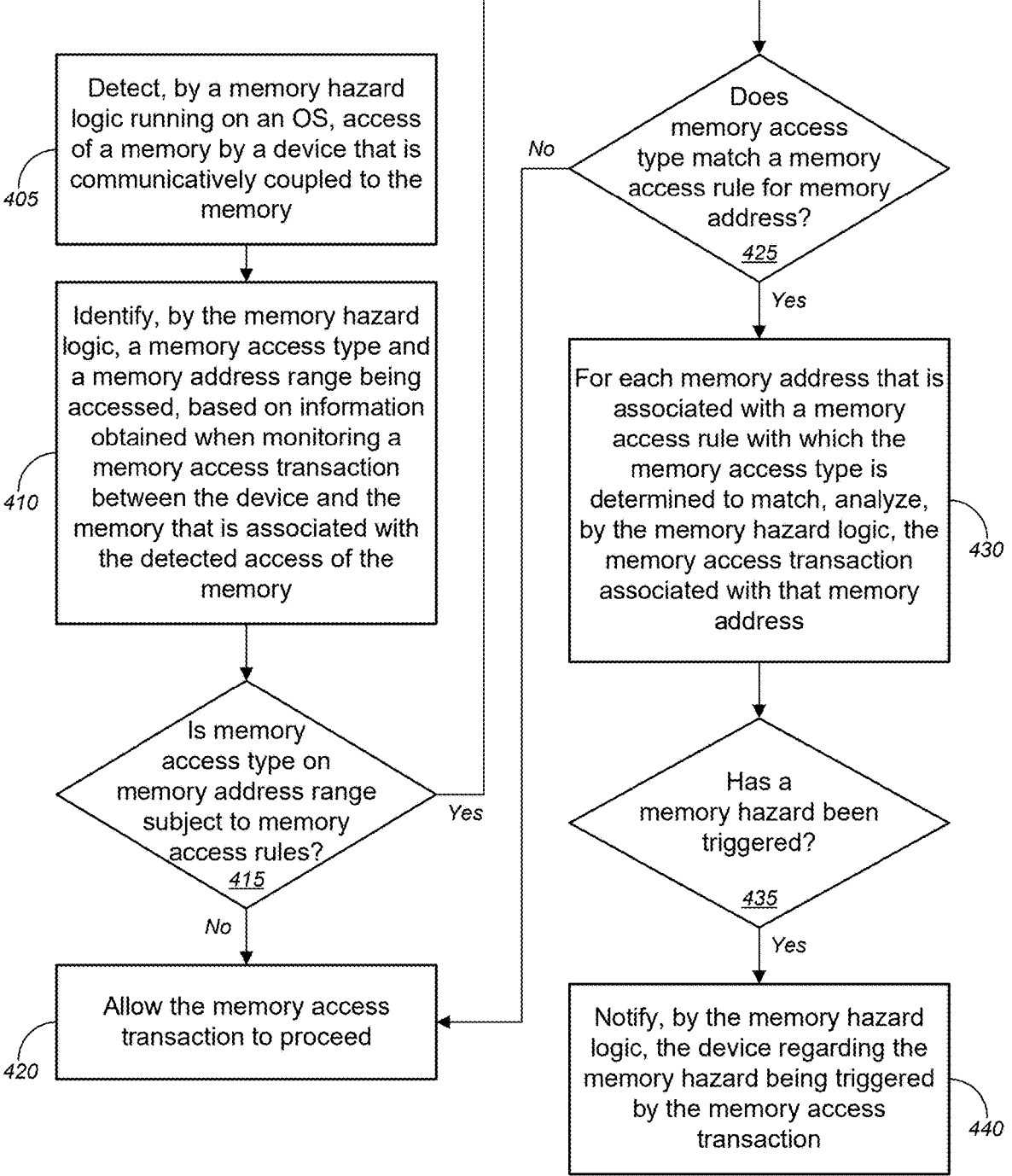
FIG. 4 depicts an example method for implementing detection of memory hazards in memory.
Figure 5A:
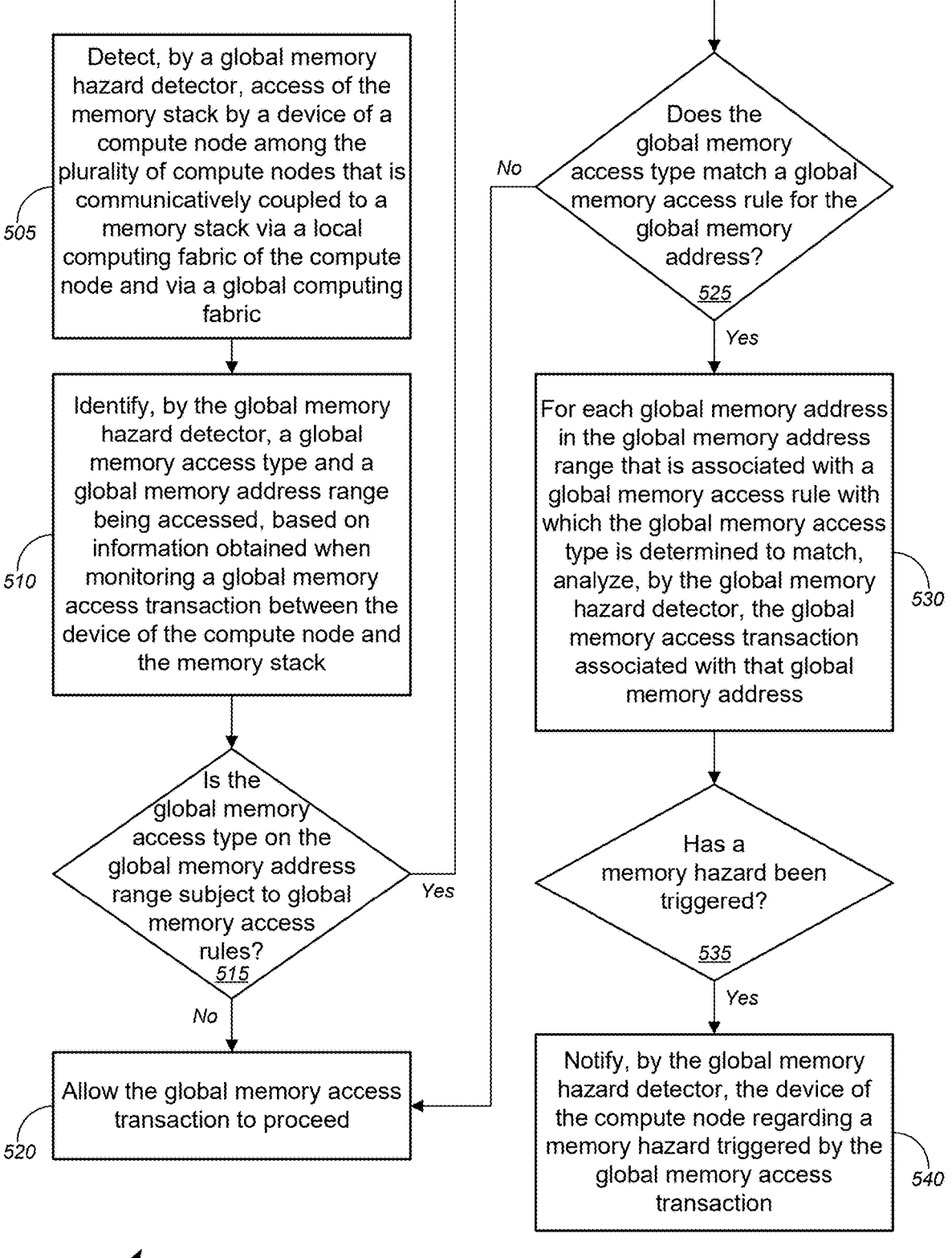
FIGS. 5A and 5B depict various other example methods for implementing detection of memory hazards in memory.
Figure 5B:
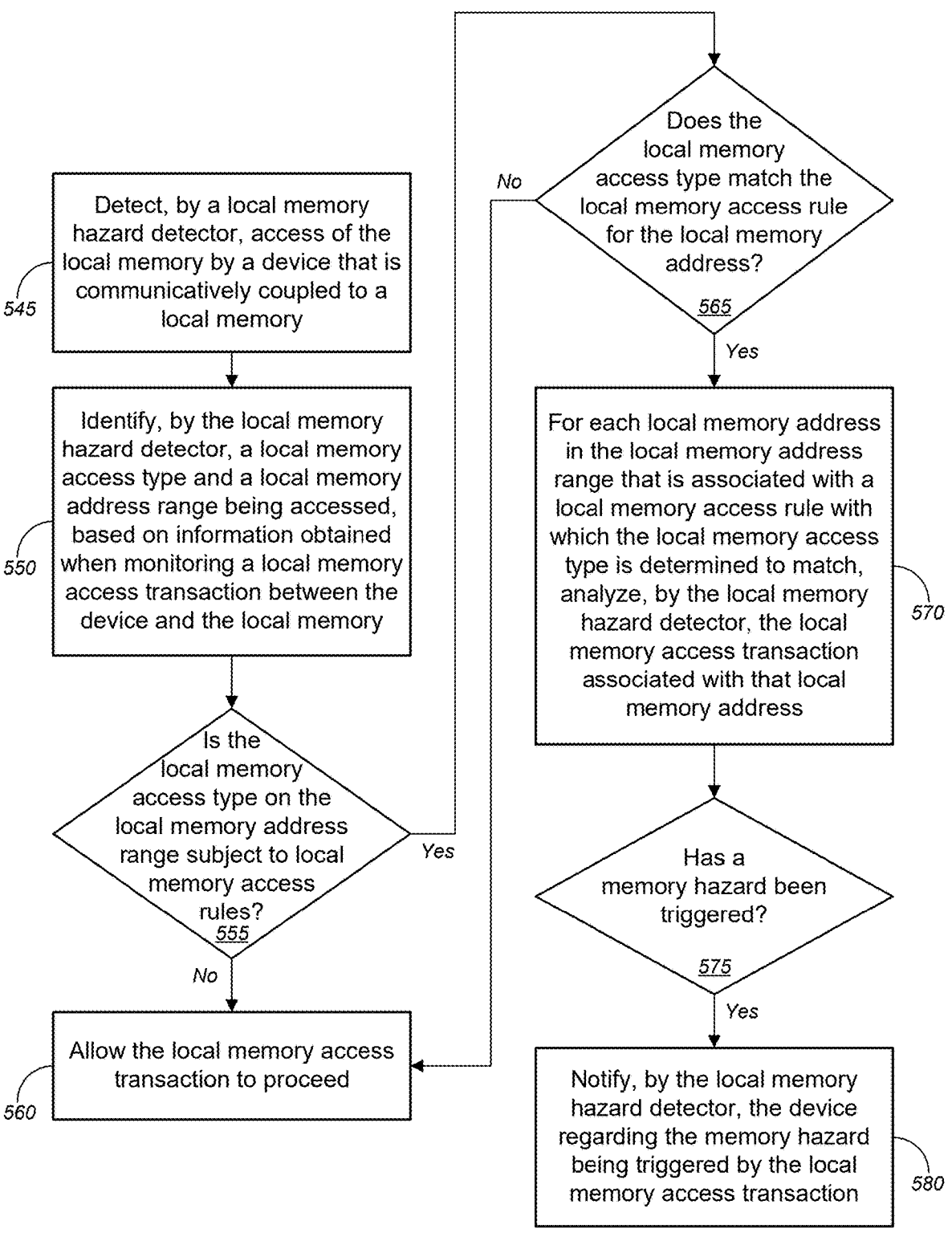

With reference to FIG. 4, the operations of example method 400 may be performed by a memory hazard logic or memory hazard detector (e.g., local memory hazard detectors 130a-130x running on OSs 135a-135x or global memory hazard detector 160 of FIG. 1). Referring to FIGS. 5A and 5B, the operations of example method 500A of FIG. 5A may be performed by a global memory hazard detector (e.g., global memory hazard detector 160 of FIG. 1), while the operations of example method 500B of FIG. 5B may be performed by a local memory hazard detector (e.g., local memory hazard detectors 130a-130x running on OSs 135a-135x of FIG. 1).

FIG. 4 depicts an example method 400 for implementing detection of memory hazards in memory. In the example of FIG. 4, method 400, at operation 405, includes the memory hazard logic detecting access of a memory by a device that is communicatively coupled to the memory, e.g., when monitoring memory access transactions between the device and the memory. At operation 410, the memory hazard logic identifies a memory access type and a memory address range being accessed, based on information obtained when monitoring a memory access transaction between the device and the memory that is associated with the detected access of the memory. At operation 415, the memory hazard logic determines whether the memory access type on the memory address range is subject to memory access rules contained in a rules table. Based on a determination that the memory access type on the memory address range is not subject to the memory access rules, the memory hazard logic allows the memory access transaction to proceed (at operation 420). Alternatively, based on a determination that the memory access type on the memory address range is subject to the memory access rules, the memory hazard logic determines whether the memory access type matches a memory access rule associated with each memory address in the memory address range (at operation 425). At operation 430, for each memory address in the memory address range that is associated with a memory access rule with which the memory access type is determined to match, the memory hazard logic analyzes the memory access transaction associated with that memory address. At operation 435, the memory hazard logic determines whether a memory hazard has been triggered by the memory access transaction based on the analysis at operation 430, and, based on a determination that a memory hazard has been triggered, notifies the device regarding the memory hazard being triggered by the memory access transaction (at operation 440).

FIGS. 5A and 5B depict various other example methods 500A and 500B for implementing detection of memory hazards in memory. Method 500A of FIG. 5A is directed to memory hazard detection for a memory stack that is accessible by a plurality of compute clusters or nodes (i.e., at a global level), while method 500B of FIG. 5B is directed to memory hazard detection for local memory that is accessible by a corresponding compute cluster or node (i.e., at a local level). The memory hazards are similar at both local level and global level, as defined by, e.g., per-page entries in a rules table (where pages can be of different sizes for memory regions of the local memory and the global memory), and the examples described above for memory hazard detection (including use of configuration bits and state bits in the per-page entries) at one level is applicable to the other.

In the example of FIG. 5A, method 500A, at operation 505, includes the global memory hazard detector detecting access of a memory stack by a device of a compute node among a plurality of compute nodes that is communicatively coupled to a memory stack via a local computing fabric of the compute node and via a global computing fabric, e.g., when monitoring global memory access transactions between the device of the compute node and the memory stack. In examples, the device includes one of a DMA engine or a local compute device.

At operation 510, the global memory hazard detector identifies a global memory access type and a global memory address range being accessed, based on information obtained when monitoring a global memory access transaction between the device of the compute node and the memory stack that is associated with the detected access of the memory stack.

At operation 515, the global memory hazard detector determines whether the global memory access type on the global memory address range is subject to global memory access rules contained in a global rules table that is maintained by the control processor. Based on a determination that the global memory access type on the global memory address range is not subject to the global memory access rules, the global memory hazard detector allows the memory access transaction to proceed (at operation 520). Alternatively, based on a determination that the global memory access type on the global memory address range is subject to the global memory access rules, the global memory hazard detector determines whether the global memory access type matches a global memory access rule associated with each global memory address in the global memory address range (at operation 525). At operation 530, for each global memory address in the global memory address range that is associated with a global memory access rule with which the global memory access type is determined to match, the global memory hazard detector analyzes the global memory access transaction associated with that global memory address. At operation 535, the global memory hazard detector determines whether a memory hazard has been triggered based on the analysis at operation 530, and, based on a determination that a memory hazard has been triggered, notifies the device of the compute node regarding the memory hazard being triggered by the global memory access transaction (at operation 540).

Referring to the example of FIG. 5B, method 500B, at operation 545, includes the local memory hazard detector detecting access of a local memory by a device that is communicatively coupled to the local memory of a compute node, e.g., when monitoring local memory access transactions between the device and the local memory. In examples, the device includes one of a DMA engine or a local compute device of the compute node.

At operation 550, the local memory hazard detector identifies a local memory access type and a local memory address range being accessed, based on information obtained when monitoring a local memory access transaction between the device and the local memory that is associated with the detected access of the local memory.

At operation 555, the local memory hazard detector determines whether the local memory access type on the local memory address range is subject to local memory access rules contained in a local rules table that is maintained by the control processor. Based on a determination that the local memory access type on the local memory address range is not subject to the local memory access rules, the local memory hazard detector allows the memory access transaction to proceed (at operation 560). Alternatively, based on a determination that the local memory access type on the local memory address range is subject to the local memory access rules, the local memory hazard detector determines whether the local memory access type matches a local memory access rule associated with each local memory address in the local memory address range (at operation 565). At operation 570, for each local memory address in the local memory address range that is associated with a local memory access rule with which the local memory access type is determined to match, the local memory hazard detector analyzes the local memory access transaction associated with that local memory address. At operation 575, the local memory hazard detector determines whether a memory hazard has been triggered based on the analysis at operation 570, and, based on a determination that a memory hazard has been triggered, notifies the one of the DMA engine or the local compute device regarding the memory hazard being triggered by the local memory access transaction (at operation 580). In some examples, the local memory hazard detector notifies the one of the DMA engine or the local compute device regarding the memory hazard in the form of an exception or interrupt. Handling of such exception or interrupt is performed at the kernel or software discretion of the DMA engine or the local compute device, including either halting complete kernel execution or logging errors and continuing processes using other portions of the local memory that do not yet have detected memory hazards.

In examples, the local compute device notifies the control processor regarding memory hazards triggered by local memory access transactions and/or regarding memory hazards triggered by local memory access transactions.

While the techniques and procedures in methods 400, 500A, and 500B are depicted and/or described in a certain order for purposes of illustration, it should be appreciated that certain procedures may be reordered and/or omitted within the scope of various embodiments. Moreover, while the methods 400, 500A, and 500B may be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the methods 400, 500A, and 500B (e.g., by executing instructions embodied on a computer readable medium), the systems, examples, or embodiments 100, 200, and 300 of FIGS. 1, 2, and 3 can each also operate according to other modes of operation and/or perform other suitable procedures.

As should be appreciated from the foregoing, the present technology provides multiple technical benefits and solutions to technical problems. For instance, using memory, such as in massively parallel and distributed systems generally raises some technical problems. For example, one technical problem includes presence of programming and/or synchronization errors with respect to memory transactions or memory access that result in memory hazards (e.g., read before write errors, double write errors, and/or double read errors). Such errors, in some cases, can lead to crashes, data corruption, incorrect data, or sub-optimal (or less than 100% accurate) results. The present technology provides for detecting memory hazards in memory, such as in massively parallel and distributed systems. During the execution of a workload (e.g., an AI workload, a content processing workload, or other workload) by a compute device, after the hardware components (e.g., page tables or rules tables, configuration setups, and memory access rules) have been configured, a memory hazard logic (such as on a memory hazard detector) monitors memory accesses, applies software programmed memory access rules, detects memory hazards (e.g., read before write errors, double write errors, double read errors, N-reads before write errors, N-writes errors, and/or N-reads errors), and notifies the compute device of detected memory hazards. In this manner, the memory hazards or issues either can be addressed by an exception handler or can be logged with other memory regions being used by the program or kernel to proceed with execution. This ultimately results in enhanced reliability of the system (with fewer crashes, less data corruption), improved memory allocation and usage, and/or reduced error rate (e.g., fewer incorrect or sub-optimal results).

Figure 6:
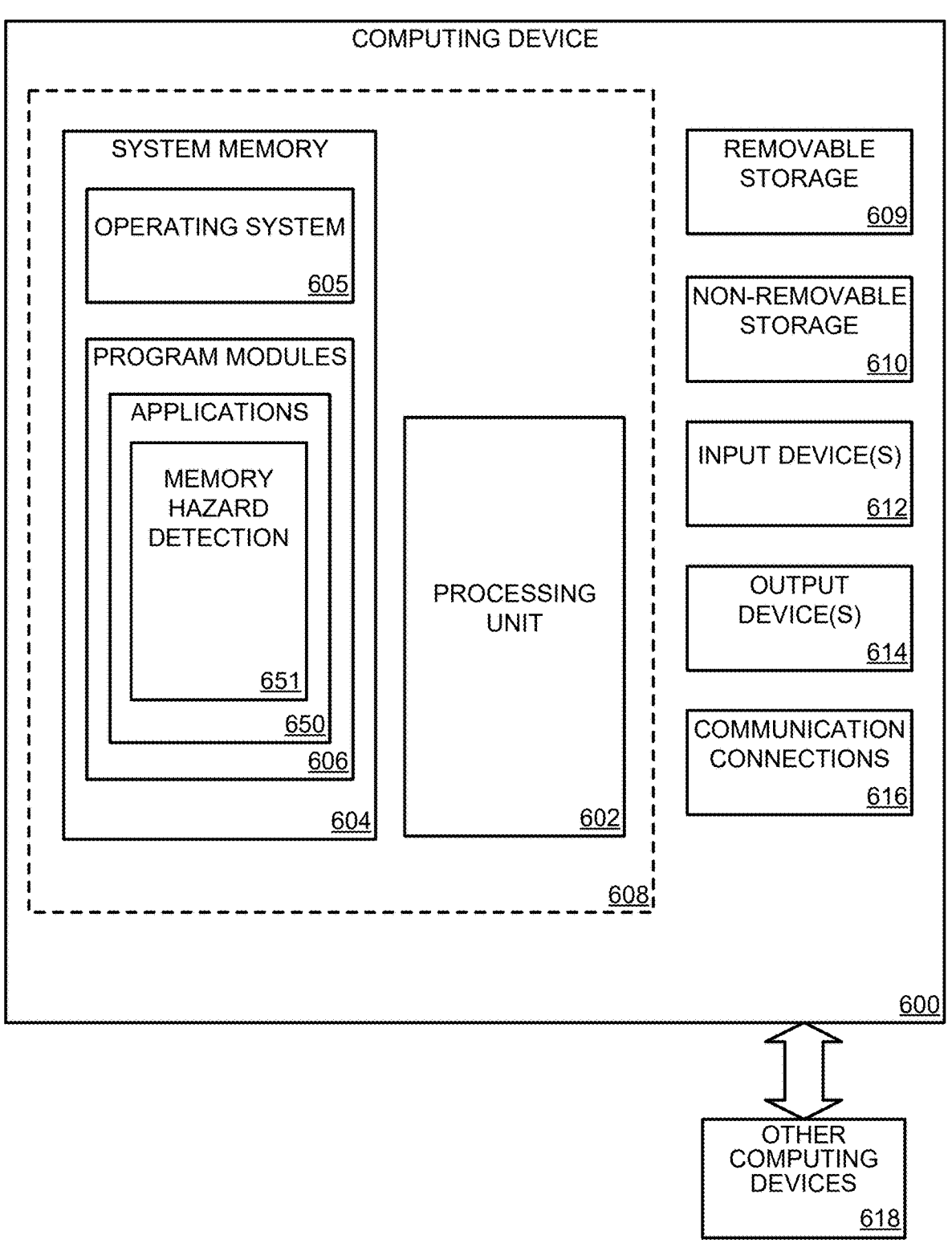
FIG. 6 depicts a block diagram illustrating example physical components of a computing device with which aspects of the technology may be practiced.

FIG. 6 depicts a block diagram illustrating physical components (i.e., hardware) of a computing device 600 with which examples of the present disclosure may be practiced. The computing device components described below may be suitable for a client device implementing the detection of memory hazards in memory, as discussed above. In a basic configuration, the computing device 600 may include at least one processing unit 602 and a system memory 604. The processing unit(s) (e.g., processors) may be referred to as a processing system. Depending on the configuration and type of computing device, the system memory 604 may include volatile storage (e.g., random access memory), non-volatile storage (e.g., read-only memory), flash memory, or any combination of such memories. The system memory 604 may include an operating system 605 and one or more program modules 606 suitable for running software applications 650, such as memory hazard detection 651, to implement one or more of the systems or methods described above.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionalities. For example, the computing device 600 may also include additional data storage devices (which may be removable and/or non-removable), such as, for example, magnetic disks, optical disks, or tape. Such additional storage is illustrated in FIG. 6 by a removable storage device(s) 609 and a non-removable storage device(s) 610.

As stated above, a number of program modules and data files may be stored in the system memory 604. While executing on the processing unit 602, the program modules 606 may perform processes including one or more of the operations of the method(s) as illustrated in FIGS. 4-5B, or one or more operations of the system(s) and/or apparatus(es)

as described with respect to FIGS. 1-3, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 600 may also have one or more input devices 612 such as a keyboard, a mouse, a pen, a sound input device, and/or a touch input device, etc. The output device(s) 614 such as a display, speakers, and/or a printer, etc. may also be included. The aforementioned devices are examples and others may be used. The computing device 600 may include one or more communication connections 616 allowing communications with other computing devices 618. Examples of suitable communication connections 616 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 604, the removable storage device 609, and the non-removable storage device 610 are all computer storage media examples (i.e., memory storage). Computer storage media may include RAM, read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05$a$-X05$n$, the integer value of n in X05$n$ may be the same or different from the integer value of n in X10$n$ for component #2 X10$a$-X10$n$, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims.

Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a memory;
a control processor;
a direct memory access ("DMA") engine;
a compute device; and
a memory hazard detector that performs operations comprising:
  detecting access of the memory by one of the DMA engine or the compute device that is communicatively coupled to the memory, when monitoring memory access transactions between the one of the DMA engine or the compute device and the memory;
  identifying a memory access type and a memory address range being accessed, based on information obtained when monitoring a memory access transaction between the one of the DMA engine or the compute device and the memory that is associated with the detected access of the memory;

determining whether the memory access type on the memory address range is subject to memory access rules contained in a rules table that is maintained by the control processor;
based on a determination that the memory access type on the memory address range is subject to the memory access rules, determining whether the memory access type matches a memory access rule associated with each memory address in the memory address range; and
for each memory address in the memory address range that is associated with a memory access rule with which the memory access type is determined to match,
  determining whether a memory hazard is triggered by the memory access transaction by analyzing the memory access transaction associated with that memory address; and
  based on a determination that a memory hazard is triggered, notifying the one of the DMA engine or the compute device regarding the memory hazard being triggered by the memory access transaction.

2. The system of claim 1, wherein the control processor includes one of an orchestrator, a scheduler, or an artificial intelligence ("AI") system processor ("ASP"), wherein the control processor is used to perform functions including:
sending messages to the compute device to schedule control of the compute device;
tracking memory errors associated with access of the memory by the one of the DMA engine or the compute device; and
scheduling commands and programs across the one of the DMA engine or the compute device.

3. The system of claim 1, wherein the compute device includes an artificial intelligence ("AI") accelerator, wherein the AI accelerator includes a neural processing unit ("NPU"), a tensor processing unit ("TPU"), or a machine learning ("ML") processor.

4. The system of claim 1, wherein notifying the one of the DMA engine or the compute device regarding the memory hazard being triggered by the memory access transaction includes the memory hazard detector notifying the one of the DMA engine or the compute device regarding the memory hazard using an exception or an interrupt, wherein the exception or the interrupt causes halting of execution of tasks performed by the one of the DMA engine or the compute device or logging of the memory hazard and continuing execution of the tasks using other portions of the memory.

5. The system of claim 1, wherein monitoring the memory access transaction is performed by implementing a snooping function on memory access transactions on a bus or a computing fabric that communicatively couples the one of the DMA engine or the compute device with the memory.

6. The system of claim 1, wherein the memory access rule associated with the memory address range includes flagging memory hazards including one of:
a read before write error;
a double write error;
a double read error;
an N-reads before write error;
an N-writes error; or
an N-reads error.

7. The system of claim 6, wherein each memory address in the memory address range corresponds to a memory page, wherein the memory access rule corresponding to the memory page is stored in the memory and is referenced in the rules table, wherein the memory access type is one of a store request corresponding to an expected write function or a load request corresponding to an expected read function, wherein the memory access rule for each memory page includes current state bits indicating whether a current state of that memory page is a write state or a read state, wherein determining whether the memory access type matches the memory access rule associated with each memory address in the memory address range comprises, for each memory address, determining whether the memory access type triggers one of the memory hazards, by comparing a state bit associated with the memory access type for that memory address with the current state bits for the corresponding memory page, wherein the state bit associated with the memory access type is one of a write bit or a read bit.

8. The system of claim 7, wherein the memory access rule for each memory page further includes at least one of:

a sequence total counter indicating a total number of write functions and read functions that correspond to both store requests and load requests corresponding to the memory access types requested for that memory page;

a write counter indicating a number of write functions that corresponds to store requests corresponding to the memory access types requested for that memory page;

a read counter indicating a number of read functions that corresponds to load requests corresponding to the memory access types requested for that memory page; or a sequence counter indicating one of a number of sequential write functions that correspond to sequential store requests corresponding to the memory access types requested for that memory page or a number of sequential read functions that correspond to sequential load requests corresponding to the memory access types requested for that memory page.

9. The system of claim 8, wherein the memory access rule for each memory page further includes at least one of:

a sequential write counter indicating a number of sequential write functions before a read function that correspond to sequential store requests before a load request corresponding to the memory access types requested for that memory page; or a sequential read counter indicating a number of sequential read functions before a write function that correspond to sequential load requests before a store request corresponding to the memory access types requested for that memory page.

10. A computer-implemented method, comprising:

detecting, by a memory hazard logic running on an operating system ("OS"), access of a memory by a device that is communicatively coupled to the memory, based on communications between a direct memory access ("DMA") engine and with the memory, when monitoring memory access transactions between the DMA engine and the memory;

identifying, by the memory hazard logic, a memory access type and a memory address range being accessed, based on information obtained when monitoring a memory access transaction between the device and the memory that is associated with the detected access of the memory;

determining, by the memory hazard logic, whether the memory access type on the memory address range is subject to memory access rules contained in a rules table;

based on a determination that the memory access type on the memory address range is subject to the memory access rules, determining, by the memory hazard logic, whether the memory access type matches a memory access rule associated with each memory address in the memory address range; and for each memory address in the memory address range that is associated with a memory access rule with which the memory access type is determined to match, determining whether a memory hazard is triggered by the memory access transaction by analyzing the memory access transaction associated with that memory address; and based on a determination that a memory hazard is triggered, notifying, by the memory hazard logic, the device regarding the memory hazard being triggered by the memory access transaction.

11. The computer-implemented method of claim 10, further comprising:

based on a determination that the memory access type on the memory address range is not subject to the memory access rules or based on a determination that the memory access type is consistent with the memory access rule associated with at least one memory address in the memory address range, allowing the memory access transaction to proceed.

12. The computer-implemented method of claim 10, wherein the device is one of a compute device or the DMA engine, wherein the compute device includes an artificial intelligence ("AI") accelerator, wherein the AI accelerator includes a neural processing unit ("NPU"), a tensor processing unit ("TPU"), or a machine learning ("ML") processor, wherein the memory is a shared memory including one of a random access memory ("RAM"), a static RAM ("SRAM"), a dynamic RAM ("DRAM"), a synchronous dynamic RAM ("SDRAM"), a double data rate ("DDR") memory, a graphics DDR ("GDDR") memory, a GDDR SDRAM, or a high bandwidth memory ("HBM") stack.

13. The computer-implemented method of claim 10, wherein monitoring the memory access transaction is performed by implementing a snooping function on memory access transactions on a bus or a computing fabric that communicatively couples the device with the memory.

14. The computer-implemented method of claim 10, wherein the memory access rule associated with the memory address range includes flagging memory hazards including one of:

a read before write error;

a double write error;

a double read error;

an N-reads before write error;

an N-writes error; or an N-reads error.

15. The computer-implemented method of claim 14, wherein each memory address in the memory address range corresponds to a memory page, wherein the memory access rule corresponding to the memory page is stored in the memory and is referenced in the rules table, wherein the memory access type is one of a store request corresponding to an expected write function or a load request corresponding to an expected read function, wherein the memory access rule for each memory page includes current state bits indicating whether a current state of that memory page is a write state or a read state, wherein determining whether the memory access type matches the memory access rule associated with each memory address in the memory address range comprises, for each memory address, determining, by the memory hazard logic, whether the memory access type triggers one of the memory hazards, by comparing a state bit associated with the memory access type for that memory address with the current state bits for the corresponding memory page, wherein the state bit associated with the memory access type is one of a write bit or a read bit.

16. The computer-implemented method of claim 15, wherein the memory access rule for each memory page further includes at least one of:

a sequence total counter indicating a total number of write functions and read functions that correspond to both store requests and load requests corresponding to the memory access types requested for that memory page;

a write counter indicating a number of write functions that corresponds to store requests corresponding to the memory access types requested for that memory page;

a read counter indicating a number of read functions that corresponds to load requests corresponding to the memory access types requested for that memory page; or a sequence counter indicating one of a number of sequential write functions that correspond to sequential store requests corresponding to the memory access types requested for that memory page or a number of sequential read functions that correspond to sequential load requests corresponding to the memory access types requested for that memory page.

17. The computer-implemented method of claim 16, wherein the memory access rule for each memory page further includes at least one of:

a sequential write counter indicating a number of sequential write functions before a read function that correspond to sequential store requests before a load request corresponding to the memory access types requested for that memory page; or a sequential read counter indicating a number of sequential read functions before a write function that correspond to sequential load requests before a store request corresponding to the memory access types requested for that memory page.

18. A system, comprising:

a control processor;

a memory stack;

a plurality of compute nodes, each compute node comprising:

a local memory;

a local compute device;

a direct memory access ("DMA") engine;

a local computing fabric communicatively coupling the local compute device and the DMA engine to the local memory; and a local memory hazard detector;

a global computing fabric communicatively coupling the control processor and the plurality of compute nodes to the memory stack; and a global memory hazard detector;

wherein global memory hazard detector performs first operations comprising:

detecting access of the memory stack by one of the DMA engine or the local compute device of a compute node among the plurality of compute nodes that is communicatively coupled to the memory stack via the local computing fabric of the compute node and via the global computing fabric, when monitoring global memory access transactions between the one of the DMA engine or the local compute device of the compute node among the plurality of compute nodes and the memory stack;

identifying a global memory access type and a global memory address range being accessed, based on information obtained when monitoring a global memory access transaction between the one of the DMA engine or the local compute device of the compute node among the plurality of compute nodes and the memory stack that is associated with the detected access of the memory stack;

determining whether the global memory access type on the global memory address range is subject to global memory access rules contained in a global rules table that is maintained by the control processor;

based on a determination that the global memory access type on the global memory address range is subject to the global memory access rules, determining whether the global memory access type matches a global memory access rule associated with each global memory address in the global memory address range; and for each global memory address in the global memory address range that is associated with a global memory access rule with which the global memory access type is determined to match, determining whether a memory hazard is triggered by the memory access transaction by analyzing the memory access transaction associated with that memory address; and based on a determination that a memory hazard is triggered, notifying the one of the DMA engine or the local compute device of the compute node among the plurality of compute nodes regarding the memory hazard being triggered by the global memory access transaction.

19. The system of claim 18, wherein each local memory hazard detector performs second operations comprising:

detecting access of the local memory by one of the DMA engine or the local compute device that is communicatively coupled to the local memory, when monitoring local memory access transactions between the one of the DMA engine or the local compute device and the local memory;

identifying a local memory access type and a local memory address range being accessed, based on information obtained when monitoring a local memory access transaction between the one of the DMA engine or the local compute device and the local memory that is associated with the detected access of the local memory;

determining whether the local memory access type on the local memory address range is subject to local memory access rules contained in a local rules table that is maintained by the control processor;

based on a determination that the local memory access type on the local memory address range is subject to the local memory access rules, determining whether the local memory access type matches a local memory access rule associated with each local memory address in the local memory address range; and for each local memory address in the local memory address range that is associated with a local memory access rule with which the local memory access type is determined to match, determining whether a memory hazard is triggered by the memory access transaction by analyzing the memory access transaction associated with that memory address; and based on a determination that a memory hazard is triggered, notifying the one of the DMA engine or the local compute device regarding the memory hazard being triggered by the local memory access transaction.

20. The system of claim 18, wherein each local compute device performs third operations comprising at least one of:

notifying the control processor regarding memory hazards triggered by local memory access transactions; or notifying the control processor regarding memory hazards triggered by global memory access transactions.

* * * * *